(12) United States Patent
Kim et al.

(10) Patent No.: US 10,374,760 B2
(45) Date of Patent: Aug. 6, 2019

(54) METHOD FOR TRANSMITTING DATA IN UNLICENSED BAND-SECONDARY CARRIER AND DEVICE FOR SAME

(71) Applicant: LG ELECTRONICS INC., Seoul (KR)

(72) Inventors: Kijun Kim, Seoul (KR); Joonkui Ahn, Seoul (KR); Hanbyul Seo, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/520,405

(22) PCT Filed: Nov. 5, 2015

(86) PCT No.: PCT/KR2015/011837
§ 371 (c)(1),
(2) Date: Apr. 19, 2017

(87) PCT Pub. No.: WO2016/072763
PCT Pub. Date: May 12, 2016

(65) Prior Publication Data
US 2017/0317798 A1 Nov. 2, 2017

Related U.S. Application Data

(60) Provisional application No. 62/105,168, filed on Jan. 19, 2015, provisional application No. 62/099,596, (Continued)

(51) Int. Cl.
*H04L 5/00* (2006.01)
*H04W 72/12* (2009.01)
(Continued)

(52) U.S. Cl.
CPC ............ *H04L 5/0012* (2013.01); *H04L 5/001* (2013.01); *H04L 5/0007* (2013.01); *H04W 72/12* (2013.01);
(Continued)

(58) Field of Classification Search
CPC ............... H04L 5/0012; H04L 5/0007; H04W 72/0446; H04W 72/0453
See application file for complete search history.

(56) References Cited

U.S. PATENT DOCUMENTS

2014/0044105 A1   2/2014   Bontu et al.
2014/0079016 A1*  3/2014   Dai ....................... H04L 5/0041
                                                        370/330
(Continued)

FOREIGN PATENT DOCUMENTS

WO   2013179095   12/2013

OTHER PUBLICATIONS

PCT International Application No. PCT/KR2015/011837, Written Opinion of the International Searching Authority dated Feb. 15, 2016, 16 pages.
(Continued)

*Primary Examiner* — Rhonda L Murphy
(74) *Attorney, Agent, or Firm* — Lee, Hong, Degerman, Kang & Waimey

(57) ABSTRACT

According to one embodiment of the present invention, a method by which a terminal transmits data in an unlicensed band-secondary carrier comprises the steps of: receiving, from a base station, a channel including scheduling information of the unlicensed band-secondary carrier in a primary carrier; and starting the transmission of a data train including a plurality of data units in the unlicensed band-secondary carrier when the scheduling information is received and the channel idles during a first sensing period, (Continued)

wherein a transmission period of the data unit is set to match a time interval of at least one downlink sub frame of the primary carrier, and the transmission period of the data unit can include a data transmission period and a second sensing period.

16 Claims, 16 Drawing Sheets

Related U.S. Application Data filed on Jan. 5, 2015, provisional application No. 62/075,906, filed on Nov. 6, 2014.

(51) Int. Cl.
*H04W 74/08* (2009.01)
*H04W 72/04* (2009.01)

(52) U.S. Cl.
CPC .............. *H04W 74/08* (2013.01); *H04L 5/005* (2013.01); *H04L 5/0051* (2013.01); *H04L 5/0053* (2013.01); *H04W 72/0446* (2013.01); *H04W 72/0453* (2013.01)

(56) References Cited

U.S. PATENT DOCUMENTS

2016/0262023 A1* 9/2016 Hiertz ................. H04W 74/006
2017/0288823 A1* 10/2017 Bhushan ........... H04W 28/0289

OTHER PUBLICATIONS

LG Electronics, "Candidate solutions for LAA operation", 3GPP TSG RAN WG1 Meeting #78bis, R1-144042, Oct. 2014, 7 pages.
LG Electronics, "Deployment scenarios for LAA", 3GPP TSG RAN WG1 Meeting #78bis, R1-144043, Oct. 2014, 7 pages.
Nokia, "Short Control Signalling for LTE LAA", 3GPP TSG RAN WG1 Meeting #78bis, R1-144186, Oct. 2014, 4 pages.

* cited by examiner

METHOD FOR TRANSMITTING DATA IN UNLICENSED BAND-SECONDARY CARRIER AND DEVICE FOR SAME

CROSS-REFERENCE TO RELATED APPLICATIONS

This application is the National Stage filing under 35 U.S.C. 371 of International Application No. PCT/KR2015/011837, filed on Nov. 5, 2015, which claims the benefit of U.S. Provisional Application No. 62/075,906, filed on Nov. 6, 2014, 62/099,596, filed on Jan. 5, 2015 and 62/105,168, filed on Jan. 19, 2015, the contents of which are all hereby incorporated by reference herein in their entirety.

TECHNICAL FIELD

The present invention relates to a wireless communication system, and more particularly, to a method of transmitting data in an unlicensed band-secondary carrier and an apparatus therefor.

BACKGROUND ART

Various devices including a smartphone, a tablet PC, and the like requiring M2M (machine-to-machine) communication and high data throughput and technologies are emerging and diffusing. Hence, an amount of data required to be processed in a cellular network is rapidly increasing. In order to satisfy the rapidly increasing data process requirements, a carrier aggregation technique for efficiently using more frequency bands, a cognitive radio technology, a multi-antenna technology for increasing data capacity transmitted in a limitative frequency, a multi-base station cooperative technology, and the like are developing. Moreover, a communication environment is evolving into a way that a density of a node capable of being accessed by a neighboring device is increasing. A node corresponds to a fixed point equipped with one or more antennas to transceive a radio signal with a user device. If a communication system is equipped with a node of high density, the communication system can provide a user device with a communication service of better performance via cooperation between nodes.

A multi-node cooperative communication system performs communication with a user device using the same time-frequency resource in a plurality of nodes. In the multi-node cooperative communication system, since each node operates as an independent base station, the multi-node cooperative communication system has significantly better performance in processing data compared to a legacy communication that performs communication with a user device without mutual cooperation.

The multi-node system performs cooperative communication using a plurality of nodes each of which operates as a base station, an access point, an antenna, an antenna group, a radio remote header (RRH), or a radio remote unit (RRU). Unlike a legacy centralized antenna system that antennas are located in a manner of being concentrated on a base station, in general, a plurality of the nodes are located in a manner of being apart from each other in the multi-node system. One or more base stations or a base station controller can manage a plurality of the nodes to control an operation of each node or schedule data to be transmitted/received by each node. A node is connected with the base station or the base station controller controlling the node via a cable or a dedicated line.

Since the multi-node system is able to communicate with a single user device or a plurality of user devices in a manner that distributed nodes transmit/receive a different stream at the same time, the multi-node system can be regarded as a sort of MIMO (multiple input multiple output) system. However, since the multi-node system transmits a signal using nodes distributed to various positions, a transmission area to be covered by each antenna is reduced compared to antennas installed in the legacy centralized antenna system. Hence, compared to the legacy system used to implement MIMO technique in the centralized antenna system, transmit power for transmitting a signal transmitted by each antenna can be decreased in the multi-node system. And, since a transmission distance between an antenna and a user device is shortened, path loss is reduced and fast transmission of data is enabled. In doing so, transmission capacity and power efficiency of a cellular system can be enhanced and communication performance of uniform quality can be satisfied irrespective of a position of a user device in a cell. Moreover, since the base station(s) and the base station controller(s) connected with a plurality of the nodes are participating in transmitting/receiving data in the multi-node system, a signal loss can be reduced in a transmission process. If nodes apart from each other as much as a prescribed distance perform cooperative communication with a user device, correlation and interference are reduced between antennas. In particular, it may be able to obtain high SINR (signal to interference-plus-noise ratio) through the multi-node cooperative communication system.

Because of the merits of the multi-node system, a next generation mobile communication system uses the multi-node system together with the legacy centralized antenna system or uses the multi-node system instead of the legacy centralized antenna system not only to reduce base station expansion cost and maintenance cost of a backhaul network but also to increase service coverage, channel capacity, and SINR.

DISCLOSURE OF THE INVENTION

Technical Task

An object of the present invention is to provide a method of transmitting data in an unlicensed band-secondary carrier in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting data in an unlicensed band-secondary carrier, the method performed by a terminal and includes receiving a channel including scheduling information of the unlicensed band-secondary carrier from a base station in a primary carrier, and when the scheduling information is received and a channel is idle during a first sensing period, starting a transmission of a data train including a plurality of data units in the unlicensed band-secondary carrier. In this case, a transmission period of the data unit may be configured to be matched with a time period of one or more downlink subframes of the primary carrier and the transmission period of the data unit may include a data transmission period and a second sensing period.

Additionally or alternately, when a channel is idle during a second sensing period of a transmission period of an $n^{th}$ (n is an integer equal to or greater than 1) data unit among the plurality of data units, the method may further include transmitting an $n+1^{th}$ data unit.

Additionally or alternately, when the terminal succeeds in transmitting consecutive data units in a transmission period of the consecutive data units, the method may further include increasing a counter value by 1, and determining whether or not the counter value reaches a maximum value. In this case, if the counter value reaches the maximum value, a data unit may not be transmitted in a transmission period of a next data unit irrespective of a channel state during the second sensing period.

Additionally or alternately, when the channel state is busy during the second sensing period, the counter value may be initialized.

Additionally or alternately, a length of a data transmission period of each data unit belonging to the plurality of data units may vary.

Additionally or alternately, a length of a data transmission period of an $n^{th}$ (n is an integer equal to or greater than 1) data unit of the plurality of data units may be proportional to the n.

Additionally or alternately, when it is determined that a channel is idle during the first sensing period and a terminal-specific backoff time followed by the first sensing period after the transmission of the data train is completed, the method may further include starting a transmission of a next data train.

Additionally or alternately, the first sensing period may be longer than the second sensing period.

Additionally or alternately, the method can further include the step of receiving configuration information on a muted subframe of the unlicensed band-secondary carrier from the eNB. In this case, the configuration information on the muted subframe may include a period and an offset of the muted subframe configuration.

Additionally or alternately, the period and the offset of the muted subframe configuration may be determined by a function of a physical layer cell identifier of the base station.

To further achieve these and other advantages and in accordance with the purpose of the present invention, according to a different embodiment, a user equipment (UE) configured to transmit data in an unlicensed band-secondary carrier includes an radio frequency (RF) unit and a processor controls the RF unit, receives a channel including scheduling information of the unlicensed band-secondary carrier from a base station in a primary carrier, when the scheduling information is received and a channel is idle during a first sensing period, starts a transmission of a data train including a plurality of data units in the unlicensed band-secondary carrier. In this case, a transmission period of the data unit is configured to be matched with a time period of one or more downlink subframes of the primary carrier and the transmission period of the data unit may include a data transmission period and a second sensing period.

Additionally or alternately, when a channel is idle during a second sensing period of a transmission period of an $n^{th}$ (n is an integer equal to or greater than 1) data unit among a plurality of the data units, the processor transmits an $n+1^{th}$ data unit.

Additionally or alternately, when the UE succeeds in transmitting consecutive data units in a transmission period of the consecutive data units, the processor may increases a counter value by 1, determines whether or not the counter value reaches a maximum value. In this case, when the counter value reaches the maximum value, a data unit may not be transmitted in a transmission period of a next data unit irrespective of a channel state during the second sensing period.

Additionally or alternately, when the channel state is busy during the second sensing period, the counter value may be initialized.

Additionally or alternately, a length of a data transmission period of each data unit of the plurality of data units may vary.

Additionally or alternately, a length of a data transmission period of an $n^{th}$ (n is an integer equal to or greater than 1) data unit of the plurality of data units may be proportional to the n.

Additionally or alternately, if it is determined that a channel is idle during the first sensing period and a terminal-specific backoff time followed by the first sensing period after the transmission of the data train is completed, the processor starts a transmission of a next data train.

Additionally or alternately, the first sensing period may be longer than the second sensing period.

Additionally or alternately, the processor receives configuration information on a muted subframe of the unlicensed band-secondary carrier from the base station. In this case, the configuration information on the muted subframe can include a period and an offset of the muted subframe configuration.

Additionally or alternately, the period and the offset of the muted subframe configuration can be determined by a function of a physical layer cell identifier of the base station.

It is to be understood that both the foregoing general description and the following detailed description are exemplary and explanatory and are intended to provide further explanation of the invention as claimed.

Advantageous Effects

According to one embodiment of the present invention, it is able to more efficiently perform wireless communication by performing carrier aggregation on an unlicensed band-secondary carrier.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
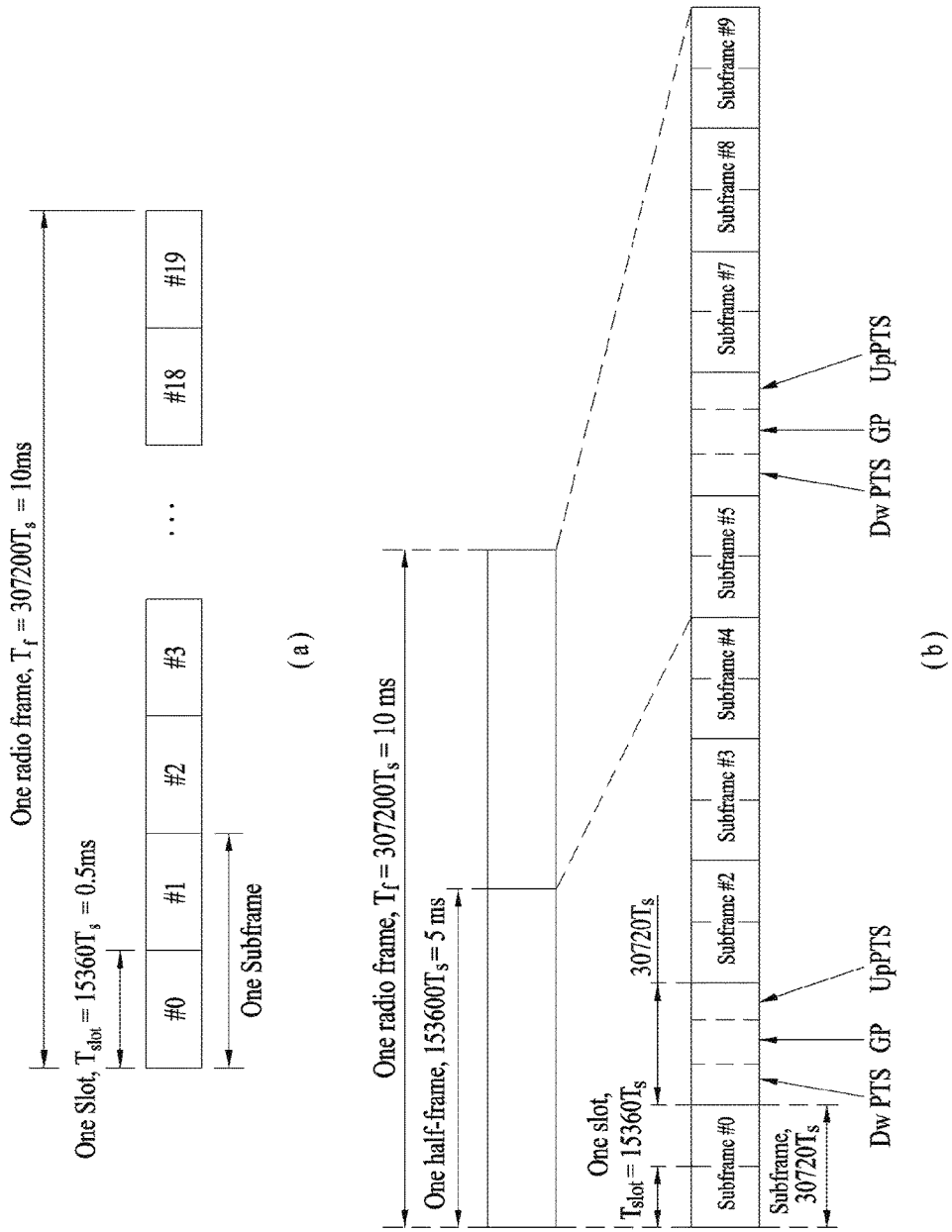
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $2048 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
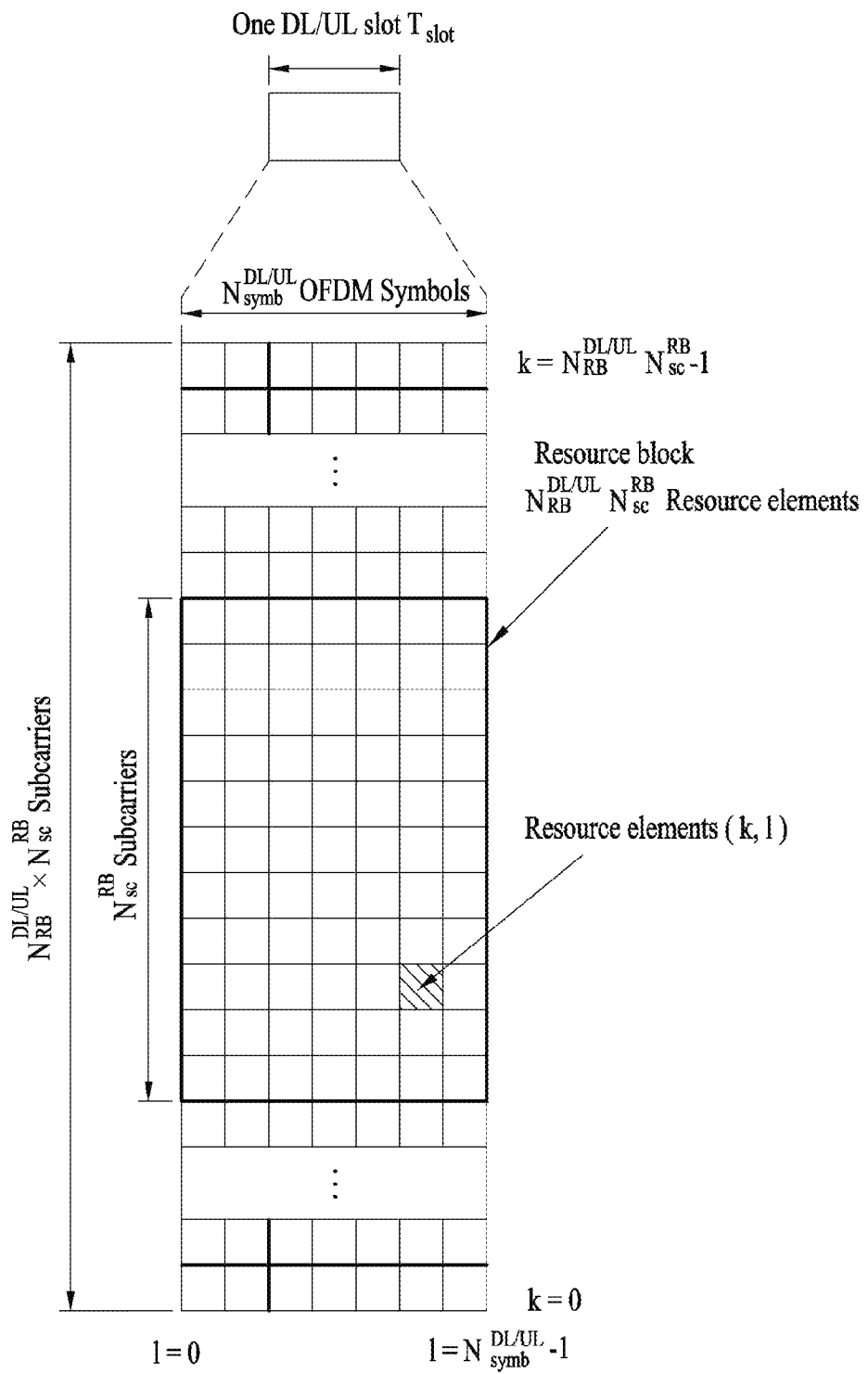
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
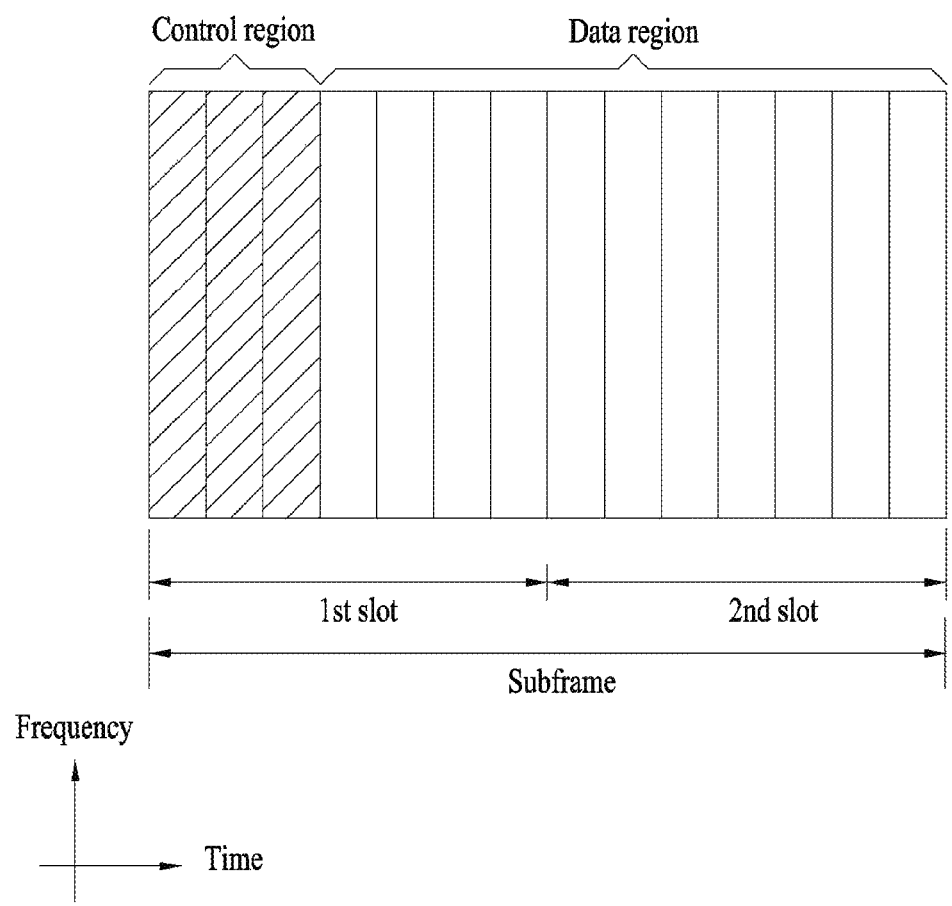
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
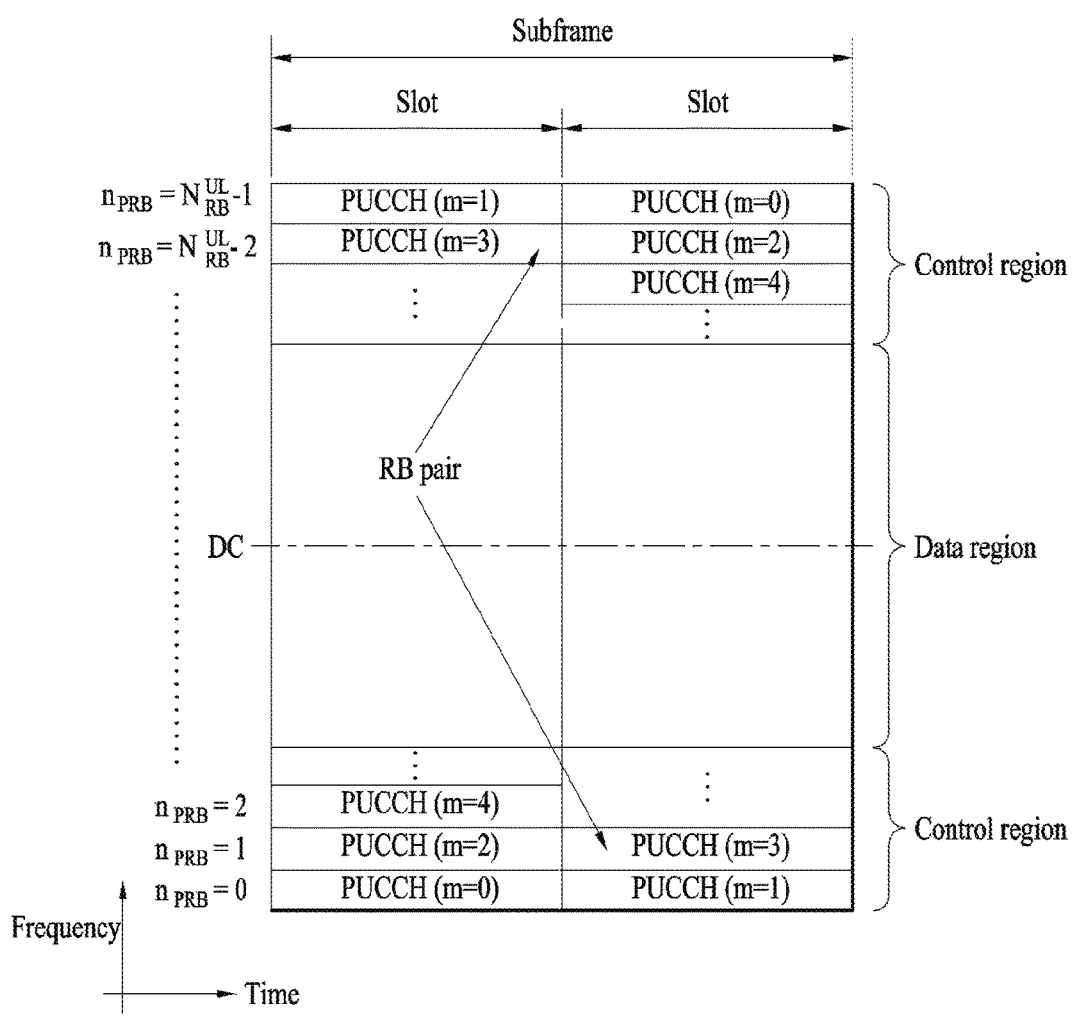
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation (CA)

Figure 6:
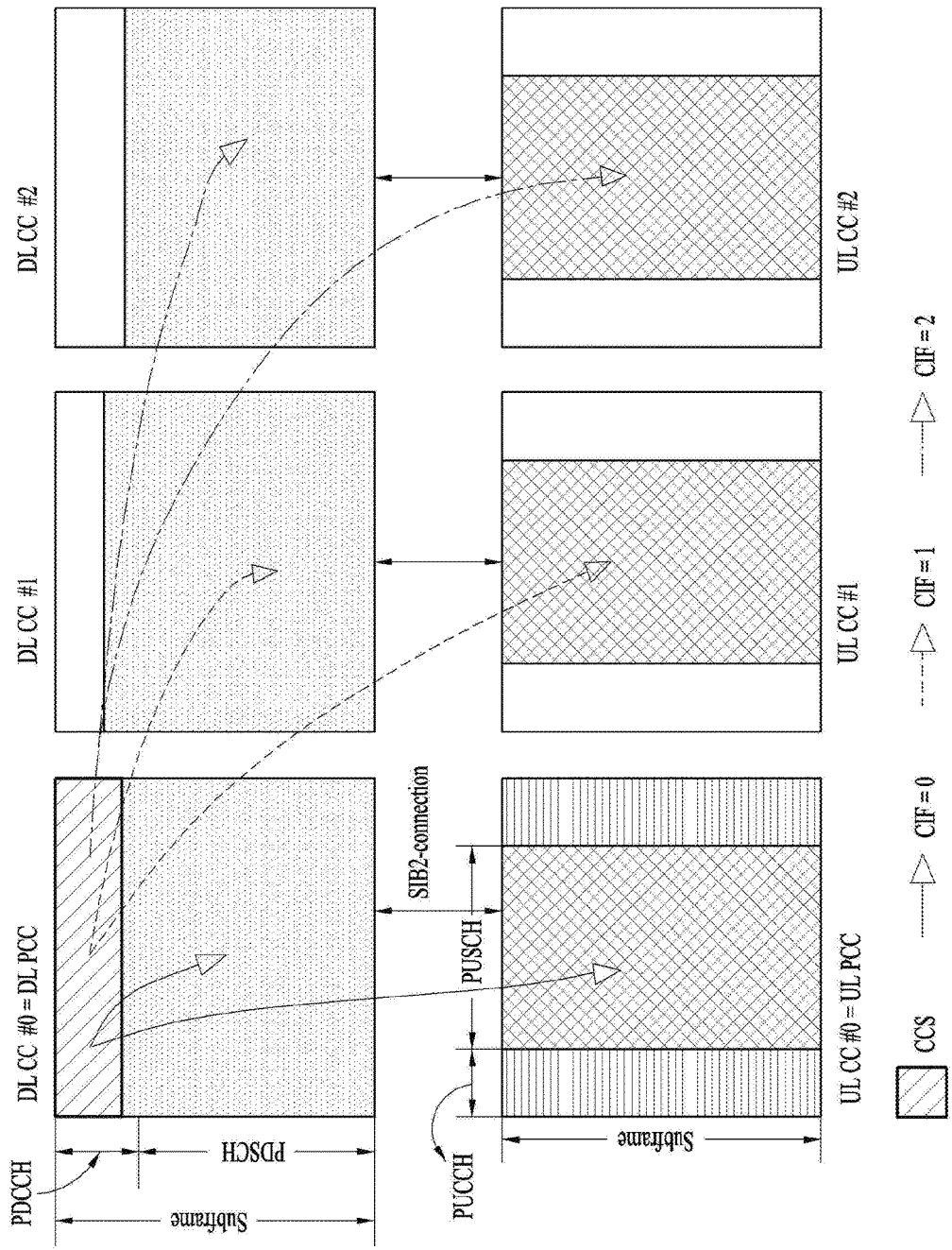
FIG. 6 is a diagram for cross scheduling used in 3GPP LTE/LTE-A system.

Carrier aggregation will hereinafter be described in detail. FIG. 6 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Figure 5:
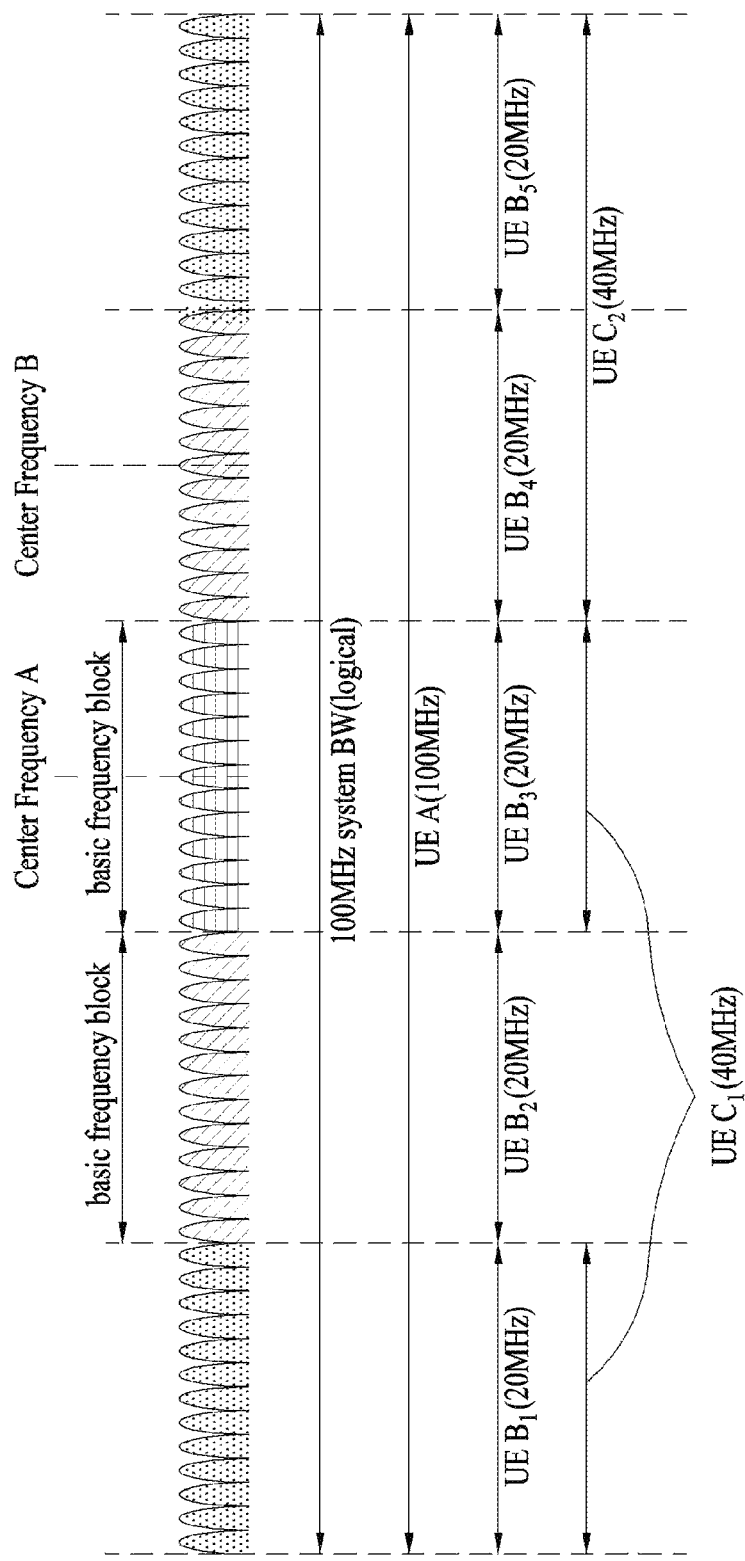
FIG. 5 is a diagram for a carrier used in 3GPP LTE/LTE-A system.

Referring to FIG. 5, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 6, this is only exemplary and the CCs may have different bandwidths. Although the CCs are shown as being contiguous in the frequency domain in FIG. 6, FIG. 6 merely shows the logical concept and thus the CCs may be physically contiguous or separated.

Different center frequencies may be used for the CCs or one common center frequency may be used for physically contiguous CCs. For example, in FIG. 6, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (S Cells).

Figure 7:
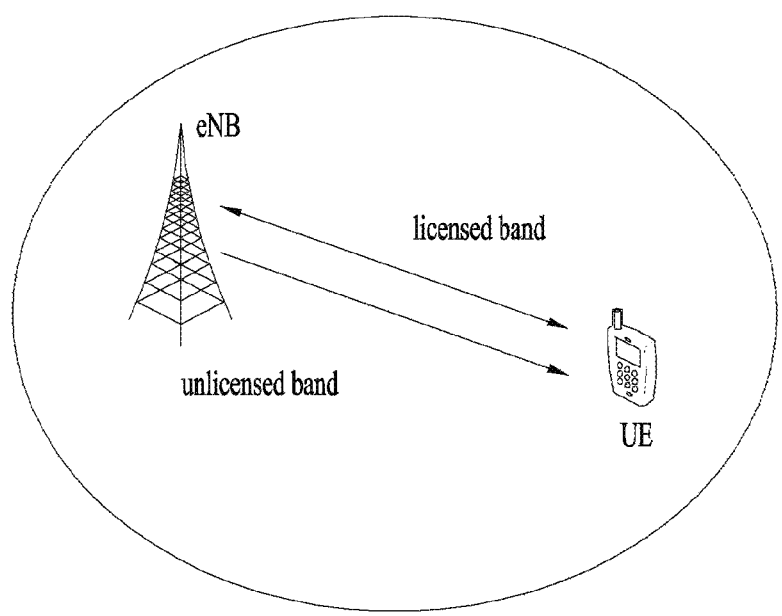
FIG. 7 is a diagram for a carrier aggregation system using an unlicensed band as a secondary carrier.

The present invention proposes a method for both a transmitter and a receiver to sense an unlicensed band and check whether or not the band is idle, a method for an eNB to transmit PDSCH, and a method for a UE to transmit PUSCH in a situation that a signal is transmitted and received through a carrier of an unlicensed band of which a dominant use of a specific system is not guaranteed. As an example, as shown in FIG. 7, when carrier aggregation is performed on LTE-A band corresponding to a licensed band and LTE-A band corresponding to an unlicensed band, an eNB may transmit a signal to a UE or the UE may transmit a signal to the eNB.

In the following, for clarity of explanation of the proposed scheme, assume that a UE is configured to perform wireless communication via two component carriers in a licensed band and an unlicensed band, respectively. In this case, as an example, a carrier of the licensed band can be referred to as a primary component carrier (PCC or PCell) and a carrier of the unlicensed band can be referred to as a unlicensed secondary component carrier (USCC or UScell). Yet, schemes proposed in the present invention can be extensively applied to a case that a plurality of licensed bands and a plurality of unlicensed bands are used via a carrier aggregation scheme. And, the schemes can also be applied to a case that a signal is transceived between an eNB and a UE using an unlicensed band only. And, the schemes proposed by the present invention can be applied not only to 3GPP LTE system but also to a system having a different characteristic.

A next generation system considers utilizing not only a legacy licensed band but also such an unlicensed band mainly used by WiFi system as 2.4 GHz band or a newly spotlighted unlicensed band such as 5 GHz for traffic offloading to efficiently utilize a frequency band. Unlike a basic licensed band, an unlicensed band assumes a scheme of having a wireless transmission/reception opportunity via contention between communication nodes. Hence, each communication node performs such a job as channel sensing before a signal is transmitted to check whether or not a different node transmits a signal. For clarity, the above mentioned operation is referred to as LBT (Listen Before Talk). In particular, the operation of checking whether or not a different node transmits a signal is referred to as CS (Carrier Sensing). If it is determined as a different communication node transmits no signal, it is defined as CCA (clear channel assessment) is checked. In LTE system, an eNB and a UE should perform LBT to transmit a signal on an unlicensed band (for clarity, LTE-U band). When the eNB or the UE transmits a signal, other communication nodes such as Wi-Fi and the like should perform LBT not to cause interference. For example, according to WiFi standard (802.11ac), a CCA threshold is regulated by −62 dBm for a non-WiFi signal and is regulated by −82 dBm for a WiFi signal. For example, if a signal other than a WiFi signal is received by power equal to or greater than −62 dBm, an STA or an AP does not perform signal transmission in order not to cause any interference.

According to the proposed scheme, in order for a base station to transmit a first burst of a data burst train, the base station should perform channel sensing. In this case, a channel should be idle during a predetermined time (T1) as a CCA condition. After a data burst is transmitted, in order for the base station to transmit an additional data burst, the base station stops transmission during a predetermined time (T2) and should perform channel sensing. If a channel is idle during T2 time after transmission of a data burst is finished, the base station can transmit an additional data burst. In the proposed scheme, the maximum number of data bursts belonging to a data burst train can be defined in advance. In order to efficiently perform the proposed scheme, the T1 is configured to be longer than the T1. By doing so, it may be able to make initial occupation of a channel to be difficult. Once a channel is occupied, a condition for additional occupation can be mitigated. According to the proposed scheme, if an interference amount provided to nodes positioned at the outside of a sensing distance is constantly maintained during a prescribed time period (i.e., during a data burst train transmission time), efficiency of an adaptive MCS transmission scheme based on CSI feedback of the nodes can be enhanced. Therefore, it is preferable to configure the data burst train transmission time to be much longer than a CSI feedback interval.

Figure 8:
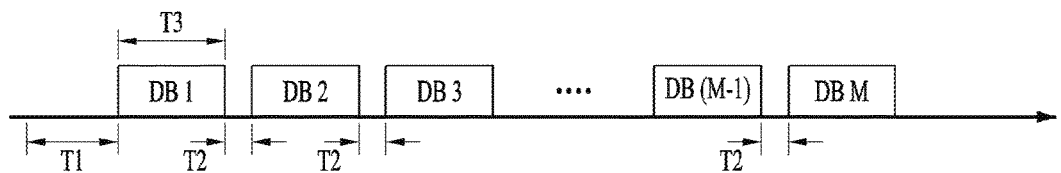
FIG. 8 is a diagram for an example of transmitting a data burst train according to one embodiment of the present invention.

FIG. 8 is a diagram for an example of transmitting a data burst train proposed by the present invention. In the example, the maximum number of data bursts (DBs) capable of being transmitted in a burst train corresponds to M. And, transmission time of data bursts corresponds to T3. FIG. 8 shows a data burst train consisting of M number of data bursts corresponding to a carriage.

Figure 9:
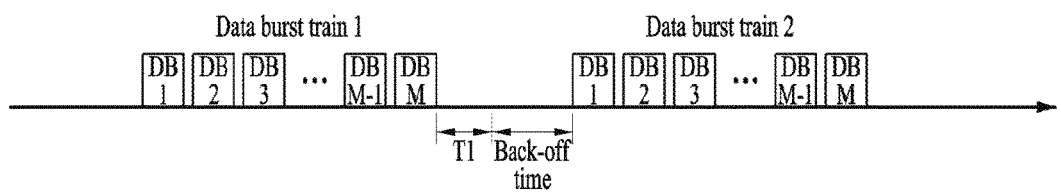
FIG. 9 is a diagram for an example of transmitting a data burst train according to one embodiment of the present invention.

FIG. 9 shows an example of transmitting consecutive data burst trains. Referring to FIG. 9, if transmission of a first data burst train is completed, a transmission node determines whether or not a channel is idle during T1 time. If the channel is idle, the transmission node waits for back-off time and then starts transmission of a second data burst train. The transmission node can additionally transmit a data burst train using the aforementioned method. In particular, in case of a data burst transmitted between data burst trains, the transmission node senses a channel during T2 time and checks whether or not the channel is idle. If the channel is idle, the transmission node can additionally transmit the data burst. On the contrary, in case of a data burst transmitted after the last data burst of a train, the transmission node senses a channel during T1 time and checks whether or not the channel is idle. The transmission node can additionally transmit the data burst only when the channel is idle in the corresponding section.

The back-off time is randomly determined and is used to prevent a case that two nodes simultaneously determine a channel is idle during T1 time and start a data burst train at the same time. In particular, if a channel is busy during back-off time, a transmission node resets a back-off operation and waits until the channel becomes idle during the consecutive T1 time again.

According to the proposed method, when two neighboring nodes occupy a channel to transmit a signal, if a node 1 transmits a data burst train, since a node 2 is unable to sense an idle channel during T1 time, the node 2 is unable to transmit data. In particular, it may be able to prevent a different a node of the same kind positioned at a near distance from occupying a channel in the middle of transmitting a data burst train. In particular, the node 2 waits until the node 1 completes transmission of the last data burst of the currently transmitted data burst train. If the two nodes simultaneously determine that a channel is idle during a T1 time period from the timing at which the node 1 has completed the transmission of the data burst train, the two nodes simultaneously enter a back-off time period. In this case, if a node among the two nodes selects a smaller back-off count, the node terminates a back-off operation earlier and starts data burst transmission to occupy the channel.

Consequently, according to the proposed method, when a node transmits a data burst train, other nodes of the same kind do not initiate data transmission in a near distance. When the transmission of the data burst train is terminated, stand-by nodes including the previous transmission node select a backoff count. A node, which has selected a smallest back-off count, starts transmission of a next data train. In particular, a channel is occupied in a unit of a data burst train among nodes of the same kind using the proposed method.

Figure 10:
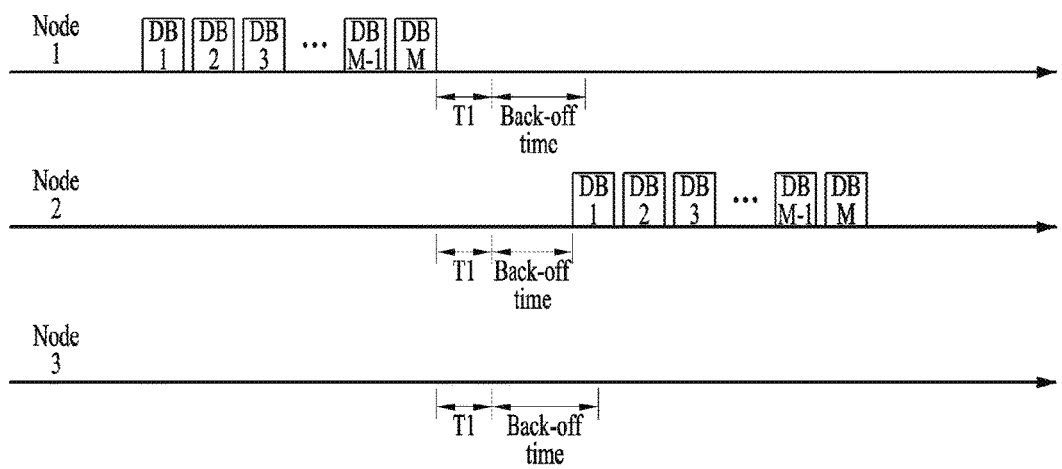
FIG. 10 is a diagram for an example of transmitting a data burst train according to one embodiment of the present invention.

FIG. 10 shows an example that 3 nodes positioned at a sensing distance transmit a contention-based data burst train according to the proposed method.

As a variation of the proposed method, when transmission of a data burst train is terminated, it may provide higher transmission possibility to standby nodes other than a node which has previously transmitted the burst train. It may consider methods described in the following.

A1) Method of differently configuring T1 time: T1 assigned to the previous transmission node and T1 assigned to standby nodes are differently configured.

A2) Method of differentiating selection range of back-off count value: Selection range of back-off count value assigned to previous transmission node and selection range assigned to standby nodes are differently configured.

A3) A node, which has transmitted a data burst of a last train, starts channel sensing after prescribed time (T4) is elapsed.

And, it may consider a differential method in proportion to time elapsed from timing at which a last data burst is transmitted by each node.

B1) Method of differently configuring T1 time: T1 is differently configured by a function of time elapsed from timing at which a last data burst is transmitted. In particular, the T1 is configured in reverse proportion to the elapsed time.

B2) Method of differentiating selection range of back-off count value: A selection range from which a back-off count value is to be selected is configured by a function of time elapsed from timing at which a last data burst is transmitted. In particular, the selection range is configured in reverse proportion to the elapsed time.

Despite the back-off-based contention, if two nodes select the same back-off count value, a collision occurs in transmitting a data burst train. As a solution for the collision, it may consider methods described in the following.

C1) When a data burst train is transmitted, it may be able to determine whether or not a collision occurs based on CSI feedback received from a UE. If a collision occurs, it may stop transmitting the burst train.

C2) Randomization of T2 value between nodes: It may be able to randomly determine sensing time T2 between consecutive data bursts within a determined range.

C3) It may place a random back-off value after T2 sensing time to start data burst transmission.

In conjunction with the proposed method, CSI feedback can be performed based on a CSI-RS transmitted in a data burst train, reception signal power measured in CSI-IM, and power of an interference signal. In particular, in relation to the C1 method, CSI is estimated in a manner of being restricted to a CSI-RS and CSI-IM, which are transmitted in a partial data burst appearing prior to CSI feedback timing as much as predetermined time. Or, the CSI is estimated in a manner of being restricted to a CSI-RS and CSI-IM, which are transmitted in a data burst appearing prior to the CSI feedback timing as many as n number of subframes.

According to the proposed method, if channel sensing is performed during a time period shorter than T2 and a channel is idle, channel occupation priority is assigned to heterogeneous nodes using a scheme of transmitting a signal. In the following, for clarity, a node to which the proposed method is applied is referred to as a node_x and a heterogeneous node is referred to as a node_y. According to the proposed method, a channel instantaneously becomes idle in a T2 sensing period, which is arranged in the middle of a data burst train transmitted by the node_x. This satisfies a CCA condition of the node_y and gives a chance of transmission to the node_y. If the node_y practically starts data transmission, since the channel becomes busy in the T2 sensing period, the node_x is unable to transmit a next data burst. As a result, transmission of a data burst train is terminated prematurely in a manner of failing to transmit a last burst.

According to a structure of the proposed method, transmission of a data burst train is terminated not by neighboring nodes of the same kind but by heterogeneous nodes. In particular, channel occupation priority varies depending on a transmission scheme of a system used by a node.

For example, T1 and T2 are configured to be greater than a DIFS (distributed coordinate function inter-frame space) of WiFi in consideration of a transmission node of Wi-Fi specification as a heterogeneous node to provide channel occupation priority to a node using a Wi-Fi transmission scheme.

Figure 11:
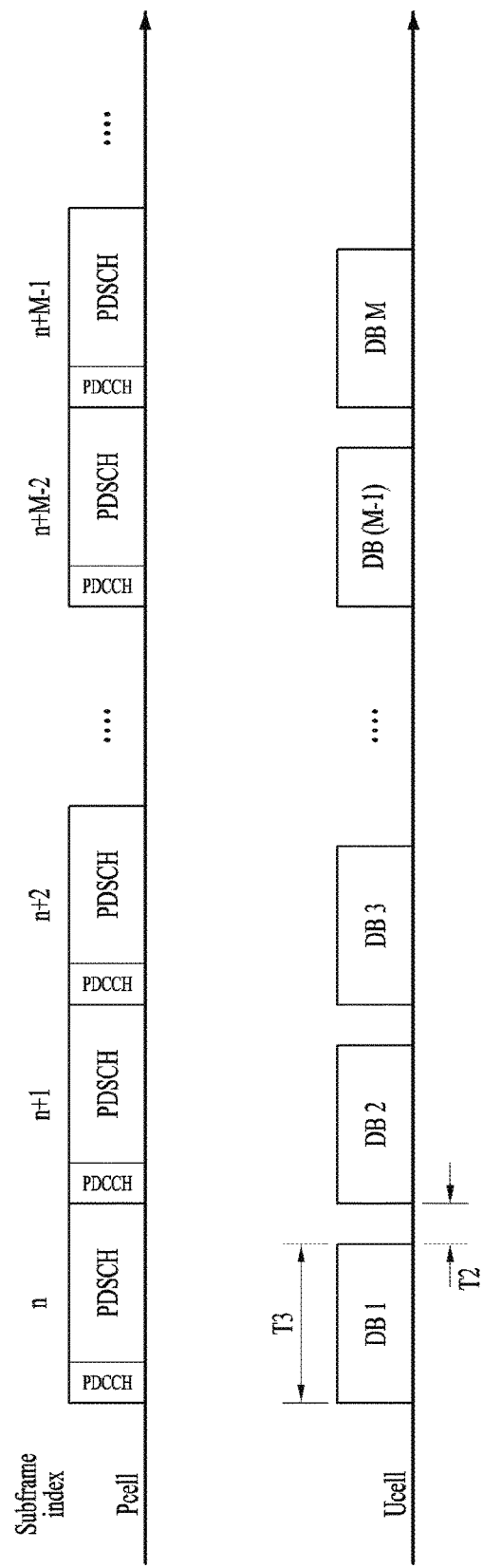
FIG. 11 is a diagram for an example of transmitting a data burst train according to one embodiment of the present invention.

The proposed method is combined with an LAA scheme to occupy a channel in an unlicensed band and transmit data. In this case, transmission of an UCell starts in accordance with a subframe boundary of a Pcell. FIG. 11 shows an example that a sum of data burst transmission time T3 of the proposed method and a sensing period T2 between data bursts is matched with a subframe section of a Pcell (licensed band).

Figure 12:
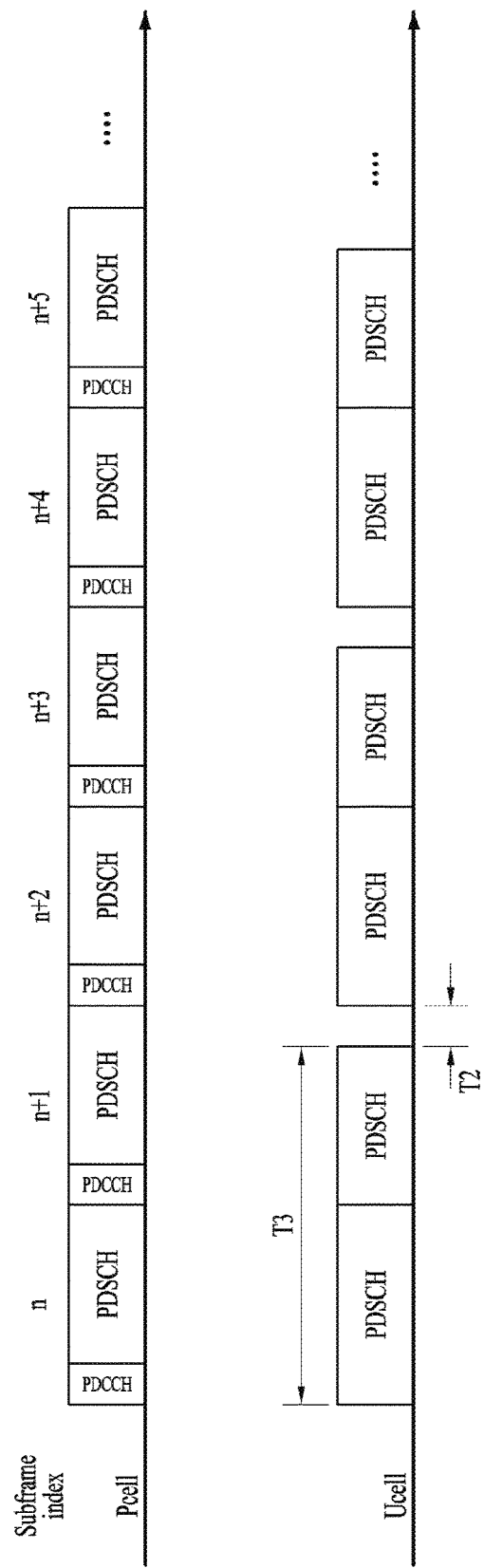
FIG. 12 is a diagram for an example of transmitting a data burst train according to one embodiment of the present invention.

As a different example, a sum of the T3 and the T2 can be matched with a plurality of subframe sections. In this case, a data burst is transmitted over a plurality of the subframe sections and a data burst is used to consecutively transmit a plurality of data packets. FIG. 12 shows a case that a sum of the T3 and the T2 is matched with two subframe sections. According to the example of FIG. 12, two data packets or two UCell PDSCHs are transmitted during a data burst section. Referring to FIG. 12, scheduling information of each UCell PDSCH is forwarded to a UE via PDCCH transmitted in a corresponding subframe of the Pcell. A transmission time length of UCell PDSCH can be differently configured depending on whether or not the sensing period T2 belongs to a corresponding subframe.

Although FIGS. 11 and 12 show a case that the sensing period T2 is located at the back of a subframe, the sensing period T2 can be configured to be located at the front of a subframe.

As a variation of the proposed method, it may consider a scheme that transmission time T3 of a data burst varies in a burst train. In this case, the T3 can be configured to vary depending on an order of a transmission burst in the burst train. As a representative example, a transmission length T3 (n) of an $n^{th}$ transmission data burst can be configured to increase as the n increases. As a transmission index of a burst increases, it may be able to determine there is less transmission possibility of a heterogeneous node. By doing so, it may be able to reduce unnecessary sensing overhead.

Figure 13:
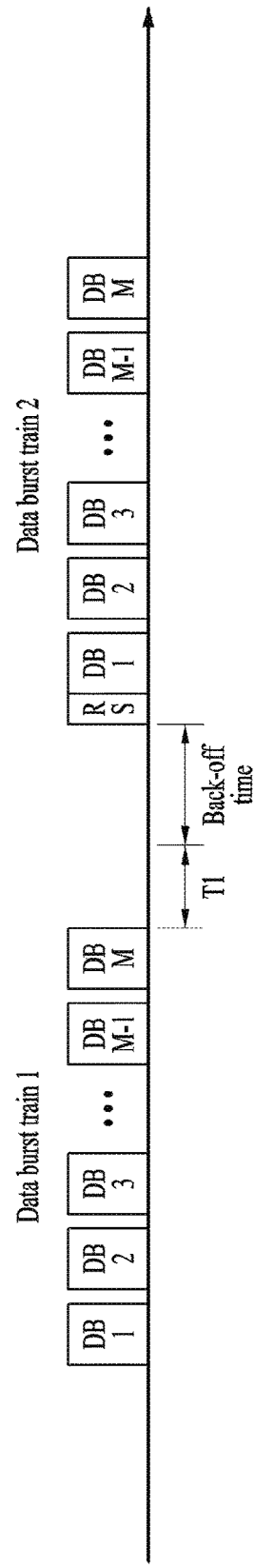
FIG. 13 is a diagram for an example of transmitting a data burst train according to one embodiment of the present invention.

According to the proposed method, if a back-off is terminated in the middle of a subframe boundary, a corresponding node can transmit a reservation signal (RS) to the front of a first data burst to occupy a channel. FIG. 13 shows an example that a reservation signal is transmitted after back-off time.

According to the proposed method, interference amount influencing on nodes located at the outside of a sensing distance is constantly maintained during a data burst train is transmitted to enhance efficiency of an adaptive MCS transmission scheme based on CSI feedbacks fed back by the nodes. Hence, if an amount of data to be transmitted is small, it is preferable not to initiate a data burst train. In particular, it may be able to configure transmission of a data burst train to be initiated only when following conditions are satisfied.

A data burst train transmission algorithm starting with T1 is applied to a data only when the data equal to or greater than a specific size (size1) is present at a buffer.

If a data exceeds a specific size (size2), the data is divided into a plurality of data. Then, a data burst train transmission algorithm starting with T1 is applied to each of a plurality of the data.

A data burst train transmission algorithm starting with T1 is applied to a specific data type (e.g., data bearer) only. Inversely, T2 is applied to a specific data type (e.g., voice, signaling bearer, etc.) only.

If it is necessary to transmit an anticipated transmission MCS and standby data amount via N number of data bursts or more, it may apply a data burst train transmission algorithm. In this case, the N can be configured to be equal to or less than M corresponding to the maximum number of data bursts permitted in a data burst train.

Figure 14:
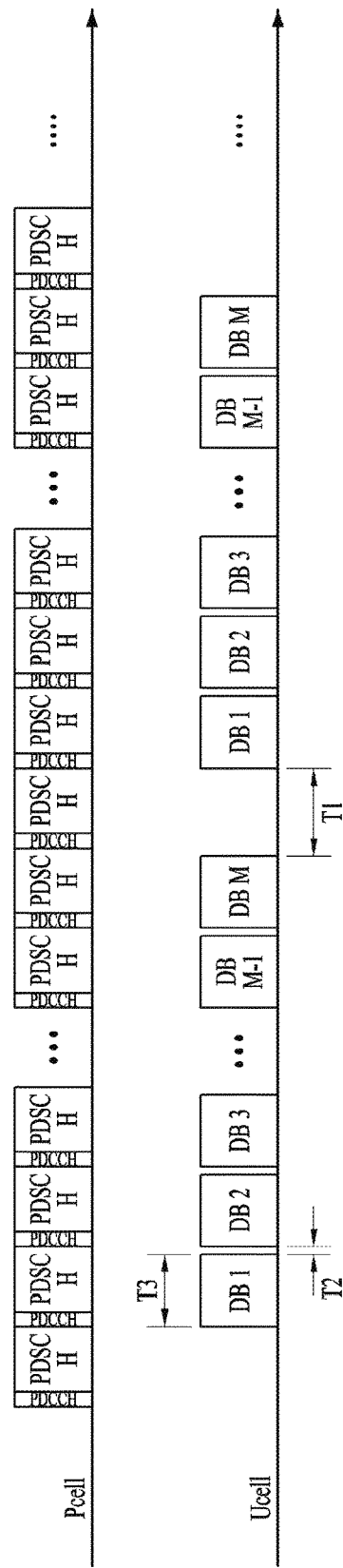
FIG. 14 is a diagram for an example of transmitting a data burst train according to one embodiment of the present invention.
Figure 15:
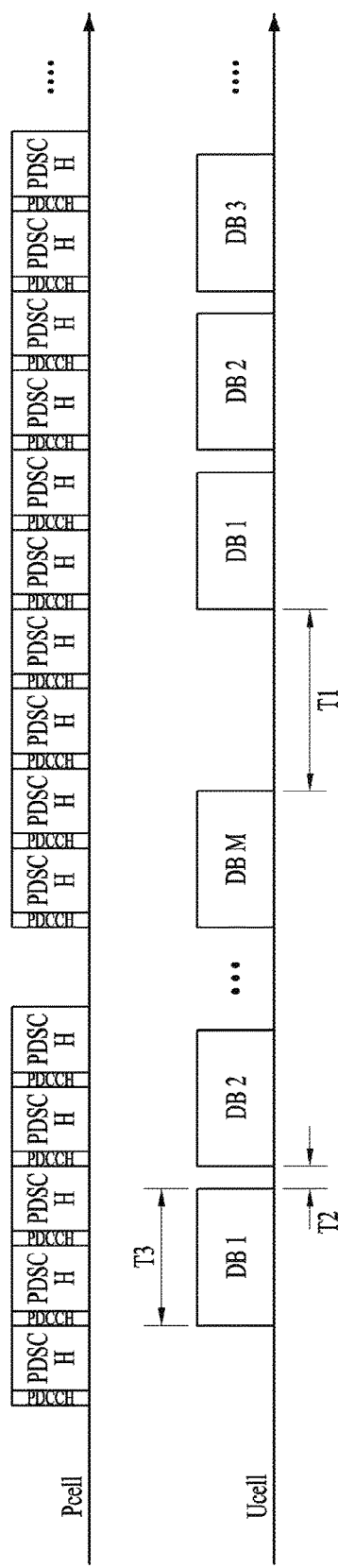
FIG. 15 is a diagram for an example of transmitting a data burst train according to one embodiment of the present invention.

As shown in FIG. 11, if UCell transmission starts in accordance with a subframe boundary of a Pcell, sensing time T1 immediately before a start burst of a data burst train can be configured as follows. A sum of data burst transmission time T3 of a data burst train and the T1 can be configured to be matched with an integer multiple of a subframe length. FIG. 14 shows an example that the sum of the T3 and the T1 corresponds to a length of two subframes. FIG. 15 shows an example that the sum of the T3 and the T1 corresponds to a length of four subframes.

Referring to FIG. 15, in order for a node to transmit a first data burst of a data burst train, it may consider conditions described in the following.

A case that a channel is idle during T1 time immediately before a frame boundary starts.

A case that standby time is equal to or more than T1 time immediately before a frame boundary starts and a channel is idle by performing CCA immediately before a frame boundary starts.

In order to transmit an additional consecutive data burst after a first data burst, it may consider conditions described in the following.

A case that a channel is idle during T2 time immediately before a frame boundary starts.

A case that standby time is equal to or more than T2 time immediately before a frame boundary starts and a channel is idle by performing CCA immediately before a frame boundary starts.

As shown in FIGS. 14 and 15, it may be able to designate a data burst to make the data burst start at a determined frame boundary. FIG. 14 shows an example that data burst transmission starts at every frame boundary. FIG. 15 shows an example that data burst transmission starts at every even-numbered frame boundary.

A base station performs CCA at designated timing to check whether or not a channel is idle. If the channel is idle, the base station transmits a data burst. According to the proposed method, the base station can consecutively transmit data bursts up to maximum M number of data bursts. After the $M^{th}$ consecutive data burst is transmitted, although a channel is idle, the base station does not transmit any signal in at least one or more data burst transmission opportunities. In particular, when the base station consecutively transmits data bursts at timings capable of transmitting the data bursts, the base station increases a count. If the count arrives at a maximum count, the base station does not transmit data at next data burst transmission timing. When a channel is sensed in a T2 gap between data bursts, if the channel is busy, the base station does not transmit a next data burst and the count is reset.

As a variation of the proposed method, although a channel is idle in a part of subframes of an UCell, the base station does not transmit a signal. A muted SF can be configured with a prescribed period. In particular, k number of consecutive SFs can be configured as muted SFs in every M number of SFs. An offset for indicating a position of the muted SFs in the M number of SFs can be independently configured according to a base station. A UE receives configuration information on the muted SFs in the UCell from a base station and does not expect DL scheduling in the muted SFs. The UE does not expect scheduling of PUSCH transmission in the muted SFs of the UCell. The configuration information on the muted SFs can be exchanged between base stations via a backhaul. In addition, a configuration position of the muted SFs can be determined as follows.

The offset for indicating the position of the muted SFs in the M number of SFs can be pseudo-randomly changed in every M number of SFs. In this case, the pseudo-random offset can be determined by a function of a physical layer cell identifier of a transmission node.

A space M between the muted SFs can be pseudo-randomly changed. In particular, the space M between a currently muted SF and a next muted SF is pseudo-randomly changed. In this case, the pseudo-random number M can be determined by a function of a physical layer cell identifier of a transmission node.

Figure 16:
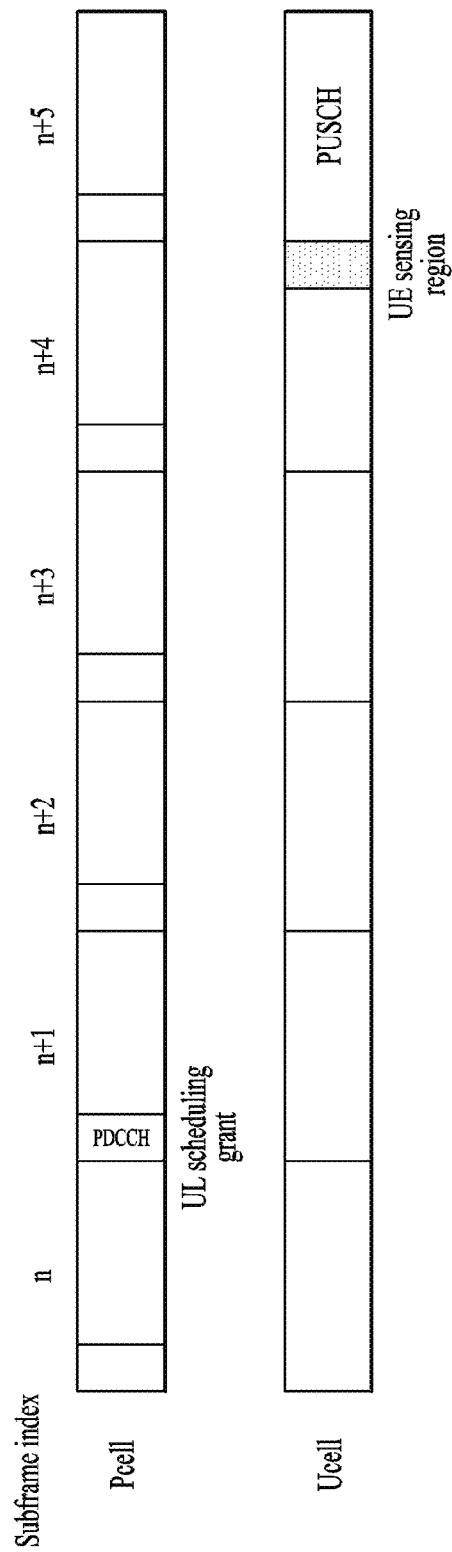
FIG. 16 is a diagram for UL transmission of a UE in an UScell.

The method of transmitting a data burst train can also be applied to a case that a UE transmits data to a base station in an UCell. FIG. 16 shows an example that a UE transmits PUSCH by the scheduling of a base station in an UCell. The base station transmits an UCell UL scheduling grant to the UE via PDCCH of a Pcell corresponding to a licensed band in an SF n+1. Having received the UL scheduling grant, the UE transmits PUSCH granted by the UL scheduling grant in an SF n+5 in the UCell.

When both DL transmission and UL transmission are considered in the UCell, each data burst of a data burst train of the present invention may correspond to a DL transmission signal or a UL transmission signal. In particular, a data burst train can be configured in a manner of mixing the DL transmission signal and the UL transmission signal. In particular, a data burst train is formed in the aspect of a base station. Each data burst of the data burst train may correspond to a DL signal transmitted by the base station or a UL transmission signal of a UE scheduled by the base station.

Or, a data burst train can be formed in the aspect of a UE. In this case, UL scheduling for more than M number of consecutive data bursts is not expected. In particular, it may be able to configure the UE not to transmit a UL signal in more than M number of consecutive data bursts. In this case, the data bursts can be represented in a unit of SFs. By doing so, it may be able to configure the UE not to expect UL scheduling in more than M number of consecutive SFs or configure the UE not to transmit a UL signal in more than M number of consecutive SFs.

Figure 17:
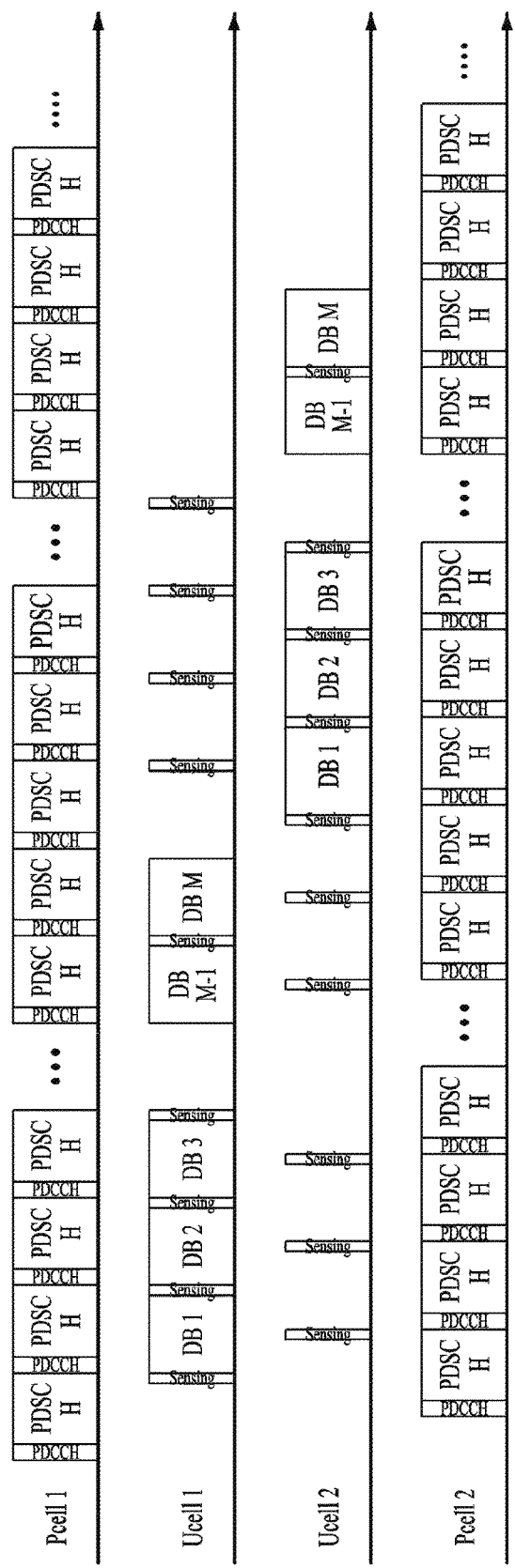
FIG. 17 is a diagram for an example of transmitting a data burst train according to one embodiment of the present invention.

FIG. 17 shows an example that two neighboring nodes alternately transmit a data burst train. Referring to FIG. 17, two neighboring nodes (Pcell1 and Pcell2) operate while not matching a subframe boundary. 0.5 subframe is mismatched between the two neighboring nodes. UCell1 preferentially transmits a data burst train. In this case, since a channel is busy in a sensing period immediately before a subframe boundary, UCell2 is unable to initiate transmission of a data burst. After the UCell1 transmits the M number of data bursts corresponding to the maximum number of data burst of a data burst train, the UCell1 stops transmission during one subframe (i.e., T1). At this time, the UCell2 determines that a channel is idle in the corresponding period and starts transmission of a data burst train. In this case, each data burst of the data burst train may correspond to PDSCH transmitted by a base station or PUSCH transmitted by a UE.

Figure 18:
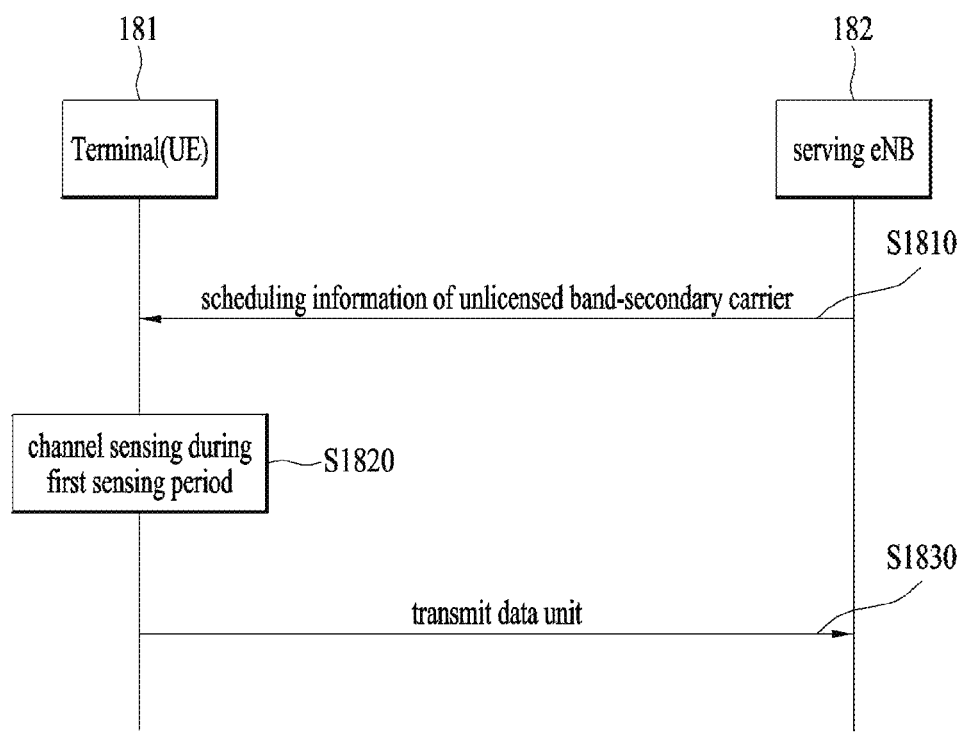
FIG. 18 is a flowchart for operations according to one embodiment of the present invention.

FIG. 18 is a flowchart for operations according to one embodiment of the present invention.

FIG. 18 relates to a method of transmitting data in an unlicensed band-secondary carrier. A UE 181 can receive a channel including scheduling information of the unlicensed band-secondary carrier from an eNB 182 in a primary carrier [S1810]. Subsequently, if the scheduling information is received, the UE can perform channel sensing during a first sensing period [S1820]. If it is determined as the channel is idle based on a result of the channel sensing, the UE can start transmission of a data train including a plurality of data units in the unlicensed band-secondary carrier [S1830]. A transmission period in which a plurality of the data units are transmitted is configured to be matched with a time period of one or more downlink subframes of the primary carrier and the transmission period in which a plurality of the data units are transmitted can include a data transmission period and a second sensing period.

Further, if a channel is idle during a second sensing period of a transmission period of an $n^{th}$ (n is an integer equal to or greater than 1) data unit among a plurality of the data units, the UE can transmit an $n+1^{th}$ data unit.

Further, if the UE succeeds in transmitting consecutive data units in transmission period of the consecutive data units, the UE can increase a counter value by 1 and determine whether or not the counter value arrives at a maximum counter value. If the counter value arrives at the maximum counter value, the UE may not transmit a data unit in a next data unit transmission period irrespective of a channel state during the second sensing period. If a channel is busy during the second sensing period, the counter value can be reset.

Further, a length of a data transmission period of each data unit of a plurality of the data units may vary. A length of a data transmission period of an $n^{th}$ (n is an integer equal to or greater than 1) data unit of a plurality of the data units can be proportional to n.

Further, after the transmission of the data train is completed, if it is determined as a channel is idle during a first sensing period and a UE-specific back-off time followed by the first sensing period, the UE can start transmission of a next data train.

Further, the first sensing period can be configured to be longer than the second sensing period.

Further, the UE can receive configuration information on a muted subframe of the unlicensed band-secondary carrier from the eNB. The configuration information on the muted subframe can include a period and offset of the muted subframe configuration.

Further, the period and the offset of the muted subframe configuration can be determined by a function of a physical layer cell identifier of the eNB.

Further, the operations of the UE and the eNB shown in FIG. 18 can include at least one from among not only the embodiments explained with reference to FIG. 18 but also the detail embodiments of the present invention.

Figure 19:
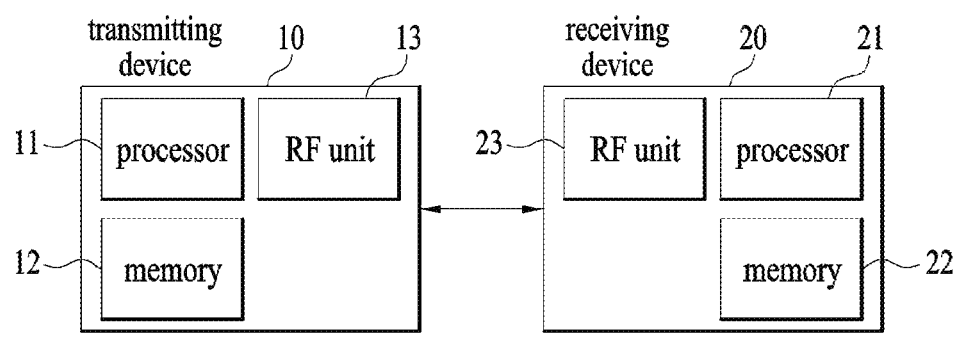
FIG. 19 is a block diagram for devices for implementing embodiment(s) of the present invention.

FIG. 19 is a block diagram of a transmitting device 10 and a receiving device 20 configured to implement exemplary embodiments of the present invention. Referring to FIG. 19, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

What is claimed is:

1. A method of transmitting data in an unlicensed band-secondary carrier, the method performed by a terminal and comprising:
receiving, by the terminal, scheduling information to transmit data on the unlicensed band-secondary carrier from a base station on a primary carrier; and
when the scheduling information is received, a channel state on the unlicensed band-secondary carrier is idle during a first sensing period T1, an amount of the data present in a buffer is equal to or greater than a predetermined amount, the data has a predetermined type, and the amount of the data is to be transmitted over a predetermined number of data units using an expected transmission modulation and coding scheme (MCS), starting a transmission of a data train including a plurality of data units 1 to M on the unlicensed band-secondary carrier,
wherein the plurality of data units 1 to M are transmitted in consecutive transmission periods T(1) to T(M), respectively,
wherein a transmission period T(m) for each of the plurality of data units 1 to M is configured to be matched with a time period of one or more downlink subframes of the primary carrier, wherein T(m) is a transmission period for a data unit m among the plurality of data units, and m=1, . . . , M,
wherein T(m) consists of a data transmission period T3(m) and a second sensing period T2, and
wherein T3(m) increases as m increases in the data train.

2. The method of claim 1, further comprising:
when the channel state on the unlicensed band-secondary carrier is idle during the second sensing period T2 for a data unit n among the plurality of data units 1 to M, wherein n denotes an integer equal to or greater than 1, and less than M, transmitting a data unit n+1.

3. The method of claim 2, further comprising:
when the terminal succeeds in transmitting consecutive data units in transmission periods for the consecutive data units:
increasing, by the terminal, a counter value by 1; and
determining, by the terminal, whether or not the counter value reaches a maximum value,
wherein when the counter value reaches the maximum value, a data unit is not transmitted in a transmission period for a next data unit irrespective of whether the channel state on the unlicensed band-secondary carrier is idle or not during the second sensing period T2.

4. The method of claim 3, wherein when the channel state on the unlicensed band-secondary carrier is busy during the second sensing period T2, the counter value is initialized.

5. The method of claim 1, further comprising:
when it is determined that the channel state on the unlicensed band-secondary carrier is idle during the first sensing period T1 and a terminal-specific backoff time followed by the first sensing period T1 after the transmission of the data train is completed, starting, by the terminal, a transmission of a next data train.

6. The method of claim 1, wherein the first sensing period T1 is longer than the second sensing period T2.

7. The method of claim 1, further comprising:
receiving, by the terminal from the base station, configuration information on a muted subframe of the unlicensed band-secondary carrier in which the transmission of the data train of the terminal is not performed regardless of whether the channel state on the unlicensed band-secondary carrier is idle or not,
wherein the configuration information on the muted subframe comprises a period and an offset for the muted subframe.

8. The method of claim 7, wherein the period and the offset for the muted subframe are determined by a function of a physical layer cell identifier of the base station.

9. A terminal configured to transmit data in an unlicensed band-secondary carrier, comprising:
a radio frequency (RF) unit; and
a processor configured to:
control the RF unit;
receive scheduling information to transmit data on the unlicensed band-secondary carrier from a base station on a primary carrier; and
when the scheduling information is received, a channel state on the unlicensed band-secondary carrier is idle during a first sensing period T1, an amount of the data present in a buffer is equal to or greater than a predetermined amount, the data has a predetermined type, and the amount of the data is to be transmitted over a predetermined number of data units using an expected transmission modulation and coding scheme (MCS), start a transmission of a data train including a plurality of data units 1 to M on the unlicensed band-secondary carrier,
wherein the plurality of data units 1 to M are transmitted in consecutive transmission periods T(1) to T(M), respectively,
wherein a transmission period T(m) for each of the plurality of data units 1 to M is configured to be matched with a time period of one or more downlink subframes of the primary carrier, wherein T(m) is a transmission period for a data unit m among the plurality of data units, and m=1, . . . , M,
wherein T(m) consists of a data transmission period T3(m) and a second sensing period T2, and
wherein T3(m) increases as m increases in the data train.

10. The terminal of claim 9, wherein when the channel state on the unlicensed band-secondary carrier is idle during the second sensing period T2 for a data unit n among the plurality of data units 1 to M, wherein n denotes an integer equal to or greater than 1, and less than M, the processor controls the RF unit to transmit a data unit n+1.

11. The terminal of claim 10, wherein when the terminal succeeds in transmitting consecutive data units in transmission periods for the consecutive data units, the processor increases a counter value by 1, and determines whether or not the counter value reaches a maximum value, and
wherein when the counter value reaches the maximum value, a data unit is not transmitted in a transmission period for a next data unit irrespective of whether the channel state on the unlicensed band-secondary carrier is idle or not during the second sensing period T2.

12. The terminal of claim 11, wherein when the channel state on the unlicensed band-secondary carrier is busy during the second sensing period T2, the counter value is initialized.

13. The terminal of claim 9, wherein when it is determined that the channel state on the unlicensed band-secondary carrier is idle during the first sensing period T1 and a terminal-specific backoff time followed by the first sensing period T1 after the transmission of the data train is completed, the processor starts a transmission of a next data train.

14. The terminal of claim 9, wherein the first sensing period T1 is longer than the second sensing period T2.

15. The terminal of claim 9, wherein the processor further controls the RF unit to receive, from the base station, configuration information on a muted subframe of the unlicensed band-secondary carrier in which the transmission of the data train of the terminal is not performed regardless of whether the channel state on the unlicensed band-secondary carrier is idle or not, wherein the configuration information on the muted subframe comprises a period and an offset for the muted subframe.

16. The terminal of claim 15, wherein the period and the offset for the muted subframe are determined by a function of a physical layer cell identifier of the base station.

\* \* \* \* \*